(12) United States Patent
Zeng

(10) Patent No.: US 12,351,245 B1
(45) Date of Patent: Jul. 8, 2025

(54) ADJUSTABLE ROOF ASSEMBLY

(71) Applicant: MULLEN AUTOMOTIVE INC., Brea, CA (US)

(72) Inventor: Samuel Zeng, Rochester Hills, MI (US)

(73) Assignee: MULLEN AUTOMOTIVE INC., Brea, CA (US)

(*) Notice: Subject to any disclaimer, the term of this patent is extended or adjusted under 35 U.S.C. 154(b) by 308 days.

(21) Appl. No.: 18/121,275

(22) Filed: Mar. 14, 2023

Related U.S. Application Data

(60) Provisional application No. 63/301,746, filed on Jan. 21, 2022.

(51) Int. Cl.
*B62D 33/08* (2006.01)
*B60J 7/16* (2006.01)

(52) U.S. Cl.
CPC .............. *B62D 33/08* (2013.01); *B60J 7/165* (2013.01)

(58) Field of Classification Search
CPC .......... B62D 33/08; B60J 7/165; B60J 7/1614
See application file for complete search history.

(56) References Cited

U.S. PATENT DOCUMENTS

| | | | | |
|---|---|---|---|---|
| 10,005,347 B1* | 6/2018 | Singer | ...................... | B60J 7/041 |
| 10,046,628 B1* | 8/2018 | Fulton | ...................... | B60P 3/42 |
| 11,572,006 B2* | 2/2023 | Tezza, II | .................. | B60P 3/343 |
| 2002/0125736 A1* | 9/2002 | Messano | .................... | B60P 3/34 |
| | | | | 296/165 |
| 2016/0347230 A1* | 12/2016 | Pellicer | .................. | B62D 33/08 |
| 2018/0339579 A1* | 11/2018 | Sullivan | .................... | B60R 9/00 |
| 2019/0061497 A1* | 2/2019 | Trinier | ...................... | B60J 7/198 |
| 2019/0185084 A1* | 6/2019 | Moler | .................. | B62D 65/024 |

FOREIGN PATENT DOCUMENTS

| | | | | |
|---|---|---|---|---|
| CN | 113442699 A | * | 9/2021 | |
| DE | 102006036453 A1 | * | 2/2008 | .............. B60J 7/165 |

OTHER PUBLICATIONS

Machine translation of CN-113442699-A (Year: 2021).*
Machine translation of DE-102006036453-A1 (Year: 2008).*

* cited by examiner

*Primary Examiner* — Hussein Elchanti
*Assistant Examiner* — Kenneth M Dunne
(74) *Attorney, Agent, or Firm* — Van Court & Aldridge LLP

(57) ABSTRACT

Systems and methods herein are directed to an adjustable roof assembly for providing an adjustable roof of a vehicle. The roof adjustment assembly includes a base with a plurality of guide tubes extending from the base. Each of the guide tubes includes an inner rod that moves relative to an outer tube at least partially surrounding the inner rod. The base includes a foldable cover extending between a first pair of guide tubes and a panel cover extending between a second pair of guide tubes. The vehicle can include a roof coupled to the base and a guide tube synchronization system to facilitate controlling movement of each inner rod of the plurality of guide tubes such that the inner rods raise at the same rate. Movement of each inner rod of the plurality of guide tubes causes the roof to raise from a lowered position to a raised position.

20 Claims, 11 Drawing Sheets

Unfold (Front View)

340

340

Fold (Side View)

ADJUSTABLE ROOF ASSEMBLY

CROSS-REFERENCE TO RELATED APPLICATION(S)

This application claims the benefit of prior filed U.S. Provisional Patent Application No. 63/301,746, filed Jan. 21, 2022, which is hereby incorporated by reference herein in its entirety.

BACKGROUND

The present disclosure relates generally to an adjustable roof assembly for a vehicle. More specifically, the present disclosure relates to an adjustable roof assembly to provide variable roof height of a vehicle.

SUMMARY

One embodiment relates to a vehicle. The vehicle can include a door panel and a body panel adjacent the door panel. The vehicle can include a roof adjustment assembly. The roof adjustment assembly can have a base located at an upper portion of the vehicle. The base can include a plurality of guide tubes extending downward from the base. Each of the plurality of guide tubes can include an outer tube and an inner rod movable between a retracted position and a fully extended position relative to the outer tube. The base can include a foldable cover positioned at least partially above the door panel and extending between a first pair of guide tubes of the plurality of guide tubes and a panel cover positioned at least partially above the body panel and extending between a second pair of guide tubes plurality of guide tubes. The vehicle can include a roof coupled to the base and a guide tube synchronization system. The guide tube synchronization system can include a first motion sensor to detect movement of a first inner rod relative to a first outer tube of the plurality of guide tubes, a first upper limit switch to detect the first inner rod is in the fully extended position, a second motion sensor to detect movement of a second inner rod relative to a second outer tube of the plurality of guide tubes, a second upper limit switch to detect the second inner rod is in the fully extended position, and a controller to receive inputs from the first motion sensor, the first upper limit switch, the second motion sensor, and the second upper limit switch. The guide tube synchronization system can receive, via the controller, a first signal from the first motion sensor and a second signal from the second motion sensor, determine, via the controller, a difference between the first signal and the second signal meets a predetermined threshold, and provide, via the controller, an indication to stop the movement of the first inner rod based on the determined difference between the first signal and the second signal.

One embodiment relates to a vehicle. The vehicle can include a door panel and a body panel adjacent the door panel. The vehicle can include a roof adjustment assembly. The roof adjustment assembly can include a base located at an upper portion of the vehicle. The base can include a plurality of guide tubes extending downward from the base. Each of the plurality of guide tubes can include an outer tube and an inner rod movable between a retracted position and a fully extended position relative to the outer tube. The base can include a foldable cover positioned at least partially above the door panel and extending between a first pair of guide tubes of the plurality of guide tubes. The base can include a panel cover positioned at least partially above the body panel and extending between a second pair of guide tubes of the plurality of guide tubes. The roof adjustment assembly can include a roof coupled to the base. The foldable cover can fold between a storage position and a fully extended position and the panel cover can move between a storage position and a fully extended position.

One embodiment relates to a method of adjusting a roof height of a vehicle. The method can include activating, by a controller, a first guide tube to cause a first cover to move between a collapsed position and an extended position. The method can include activating, by the controller, a second guide tube to cause a second cover to move between a stored position and a use position. The method can include receiving, by the controller, a first signal indicating that the first guide tube is moving at a first rate at a first unit of time from a first motion sensor coupled to a portion of the first guide tube. The method can include receiving, by the controller, a second signal indicating that the second guide tube is moving at a second rate at a second unit of time a second motion sensor coupled to a portion of the second guide tube. The method can include determining, by the controller, a difference between the first signal and the second signal meets a predetermined threshold. The method can include providing, by the controller, an indication to stop the movement of the first guide tube based on the determined difference between the first signal and the second signal.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle can include one or more body panels and one or more door panels. The vehicle can include a roof adjustment assembly having a base located at an upper portion of the vehicle. The base can include a plurality of guide tubes extending downward from the base. Each of the plurality of guide tubes can include an outer tube and an inner rod movable between a retracted position and a fully extended position relative to the outer tube. The base can include a foldable cover extending above one of the body panels and between a first pair of guide tubes of the plurality of guide tubes and a panel cover above a second body panel and extending between a second pair of guide tubes plurality of guide tubes. The vehicle can include a roof coupled to the base and a guide tube synchronization system. The guide tube synchronization system can include a first motion sensor to detect movement of guide tube, a first upper limit switch to detect when the first guide tube is in the fully extended position, a second motion sensor to detect movement of a second guide tube, a second upper limit switch to detect the second guide tube is in the fully extended position, and a controller to receive inputs from the first motion sensor, the first upper limit switch, the second motion sensor, and the second upper limit switch. The guide tube synchronization system can receive, via the controller, a first signal from the first motion sensor and a second signal from the second motion sensor, determine, via the controller, a difference between the first signal and the second signal meets a predetermined threshold, and provide, via the controller, an indication to stop the movement of the first inner rod based on the determined difference between the first signal and the second signal. Accordingly, the guide tube synchronization system can facilitate simultaneously raising each guide tube such that the roof can adjust from a minimum height to a maximum height.

Figure 1:
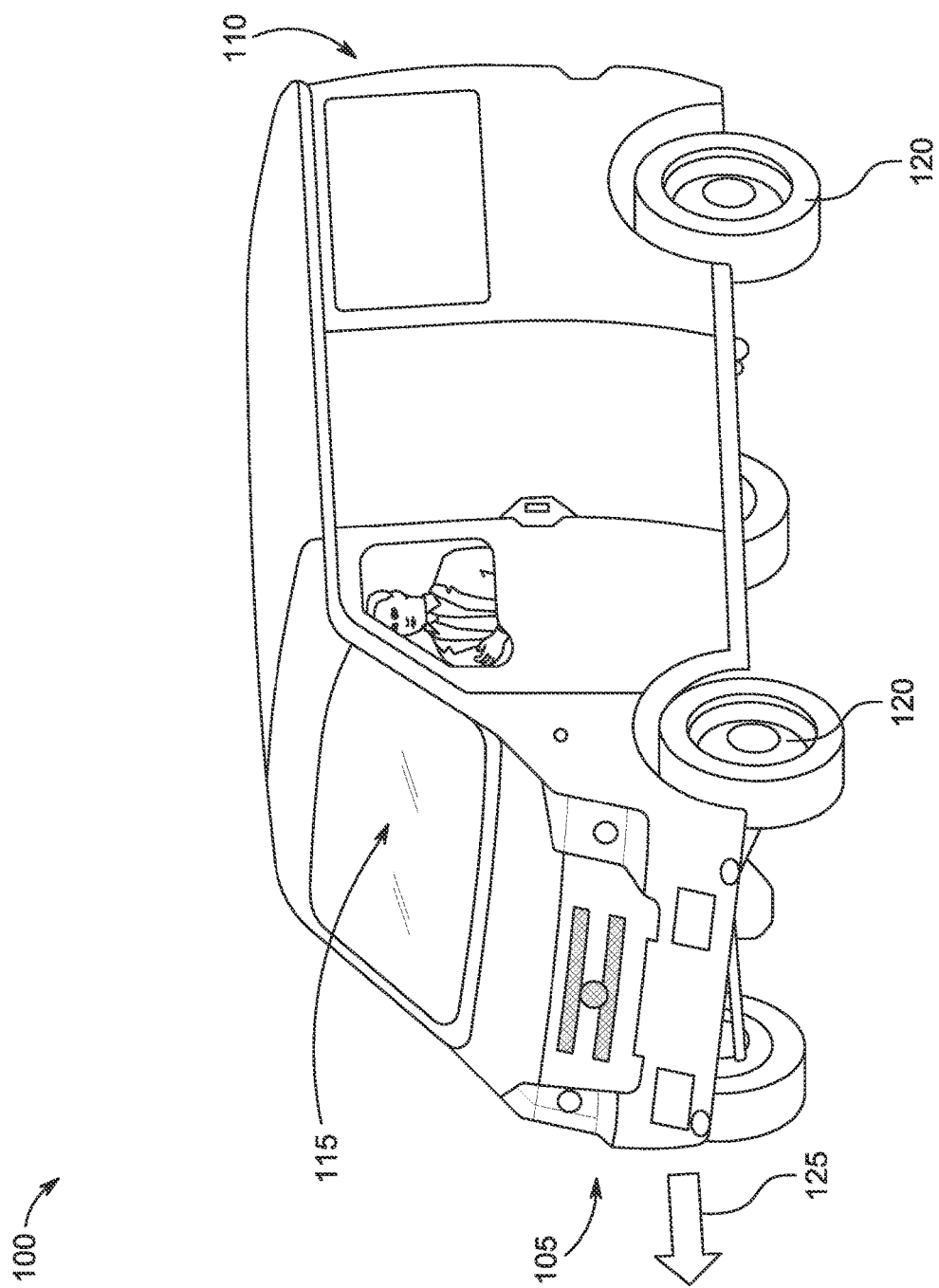
FIG. 1 is a front perspective view of a vehicle, according to an exemplary embodiment.

As shown in FIG. 1, a vehicle 100 can include a front end 105 and an opposing rear end 110. For example, the front end 105 can be positioned towards the front of the vehicle 100 such that, in a normal operating position, the front end 105 is at the front of a forward direction of travel, as shown in arrow 125. The vehicle 100 can include a cabin 115. For example, the cabin 115 can include space for an operator of the vehicle 100. Generally, the operating cabin 115 can be enclosed by a body, frame, or outermost 705t portion of the vehicle 100. For example, the body of the vehicle 100 can include a frame and a plurality of wheels 120 coupled to the frame for movably supporting the vehicle 100 relative to a plane (e.g., road, ground, etc.). By way of example, the cabin 115 can include one or more seats for a user to operate the vehicle 100. According to another example, the vehicle 100 may be operated autonomously or semi-autonomously (e.g., vehicle includes a sensor for automatic steering, etc.). The vehicle 100 can include two front wheels 120 and two rear wheels 120, as shown in FIG. 1.

In one embodiment, the vehicle 100 is configured as an on-road vehicle such as a sedan, a sport utility vehicle ("SUV"), a pickup truck, a van, and/or still another type of passenger vehicle. In other embodiments, the vehicle 100 is configured as another type of on-road vehicle such as a semi-truck, a bus, or the like. In still other embodiments, the vehicle 100 is configured as an off-road vehicle such as construction machinery, farming machinery, or the like. The vehicle 100 can be any electric vehicle (e.g., EV, BEV, HEV, PHEV, etc.), an internal combustion engine vehicle, or another similar vehicle.

Figure 3:
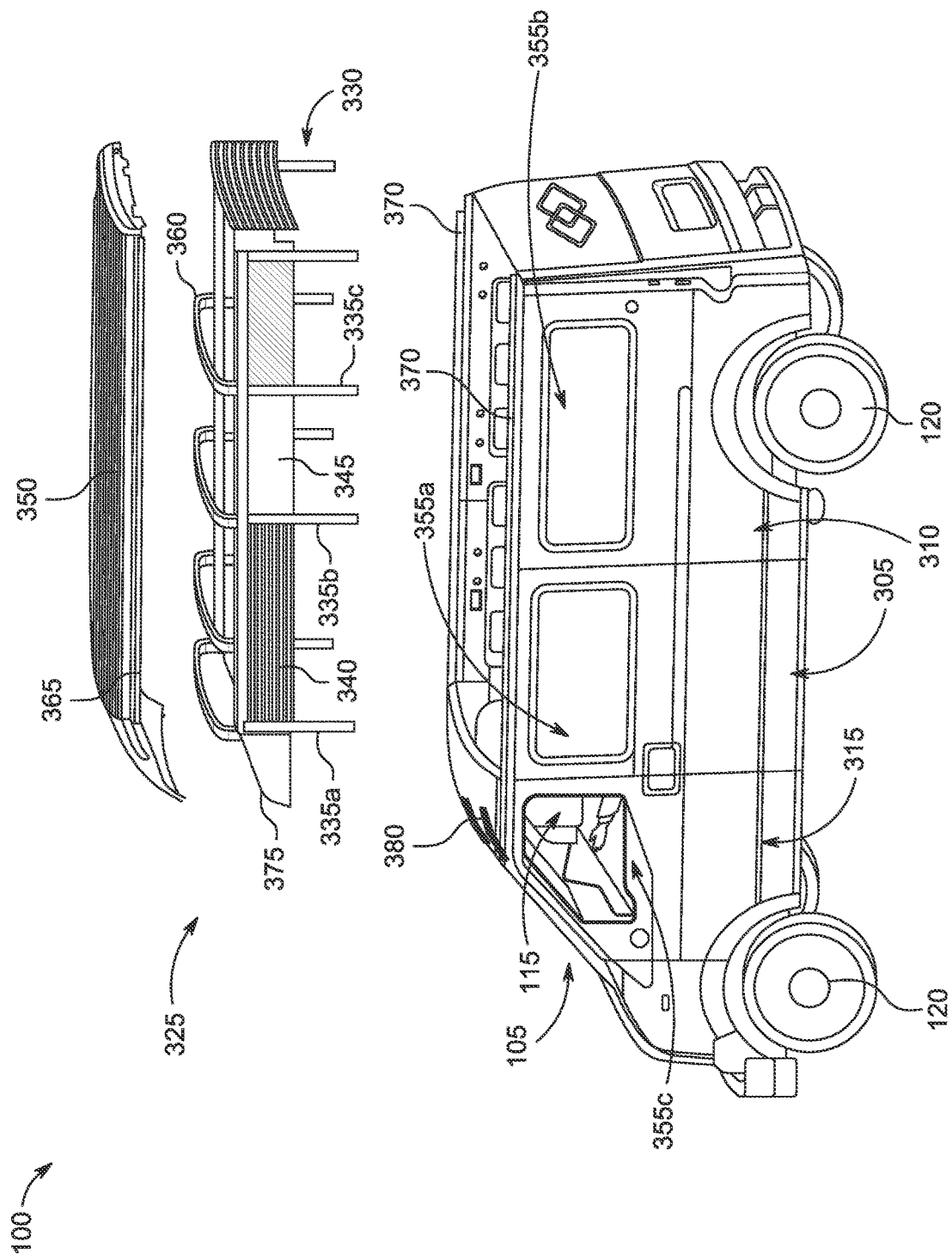
FIG. 3 is an exploded perspective view of the vehicle of FIG. 1, according to an exemplary embodiment.

As shown throughout the figures, and in greater detail in FIG. 3, the vehicle 100 can include a first door panel 305 and a body panel 310. For example, the door panel 305 may include a window (e.g., first window 355a) and one or more components (e.g., hinges, handles, etc.) to facilitate rotating or sliding a portion of the first door panel 305 to open the first door panel 305 (e.g., to expose the cabin 115). In some embodiments, the first door panel 305 may not open (e.g., does not include any hinges, handles, etc.). In some embodiments, the first window 355a of the first door panel 305 can open to expose the cabin 115 (e.g., slide into a portion of the door panel 305). In some embodiments, the first window 355a may include one or more transparent portions such that the interior cabin 115 is visible through the first window 355a. The body panel 310 can include one or more windows (e.g., second window 355b). In some embodiments, the second window 355b is different from the first window 355a. For example, the second window 355b may not open to expose the cabin 115. In some embodiments, the second window 355b may include one or more opaque portions such that the interior cabin 115 is not visible through the second window 355b. In some embodiments, the second window 355b is the same as the first window 355a. In some embodiments, the second door panel 315 may include one or more components (e.g., hinges, handles, etc.) to facilitate rotating or sliding a portion of the second door panel 315 to open the second door panel 315 (e.g., to expose the cabin 115).

The vehicle 100 can include a second door panel 315. In some embodiments, the second door panel 315 differs from the first door panel 305. For example, the second door panel 315 may differ in shape and/or size in comparison to the first door panel 305, as shown throughout the figures. In some embodiments, the second door panel 315 may be the same or include similar features to the first door panel 305. The second door panel 315 may include one or more windows (e.g., third window 355c). In some embodiments, the third window 355c may include one or more transparent portions such that the interior cabin 115 is visible through the third window 355c. In some embodiments, the third window 355c of the second door panel 315 can open to expose the cabin 115 (e.g., slide into a portion of the second door panel 315).

The vehicle 100 can include a roof adjustment assembly 325. For example, the roof adjustment assembly 325 can include a base 330 located at an upper portion (e.g., away from the wheels 120) of the vehicle 100. The base 330 can include a plurality of guide tubes 335 (e.g., first guide tube 335a, second guide tube 335b, third guide tube 335c, etc.) extending downward from the base 330. For example, each of the guide tubes 335 can extend from a portion of the base 330 in a downward direction, such as towards the wheels 120, as shown in FIG. 3. The base 330 can include a various amount of guide tubes 335. For example, the base 330 can include two or more guide tubes 335. The base 330 can include six guide tubes 335, as another example. The base 330 can include eight guide tubes 335, as yet another example.

As shown in FIG. 6-9, each of the guide tubes 335 can include an outer tube 610 and an inner rod 605 movable relative to the outer tube 610. For example, the outer tube 610 can be or can include any rod, tube, or the like that includes at least one hollow portion to receive the inner rod 605. In some embodiments, the diameter of the inner rod 605 may be slightly smaller than the inner diameter of the outer tube 610 such that the inner rod 605 can move in an axial direction (e.g., up or down while the vehicle 100 is operating in normal conditions) relative to the outer tube 610. In some embodiments, the guide tubes 335 include a cylindrical shape, as shown throughout the figures. In some embodiments, one or more of the guide tubes 335 may include a different shape including, but not limited to, a rectangular shape. In some embodiments, the outer tube 610 is fixed in place. For example, the outer tube 610 may fixedly couple to a portion of the vehicle 100 such that the outer tube 610 does not move relative to the vehicle 100. In some embodiments, each of the outer tubes 610 may couple to an interior portion of the vehicle 100 such that the outer tubes 610 are not exposed (e.g., visible) to an exterior portion of the vehicle 100.

Each of the inner rods 605 can move between a retracted position and a fully extended position. For example, in the retracted position, at least a portion of the inner rod 605 is disposed inside of the outer tube 610 such that the inner rod 605 is at a minimum height relative to the outer tube 610 (e.g., the inner rod 605 is substantially within the outer tube 610). In the fully extending position, the inner rod 605 may be disposed substantially outside of the outer tube 610 (e.g., such that only a portion of the inner rod 605 is not exposed outside of the outer tube 610). Each inner rod 605 can continuously and/or intermittently move between the retracted position and the fully extended position. For example, each inner rod 605 can extend from the retracted position until the inner rod 605 reaches the fully extend position. Similarly, each inner rod 605 can retract from the fully extended position to the retracted position. Accordingly, each guide tube 335 can extend between a plurality of intermediate positions in between the retracted position and the fully extended position.

Figure 4:
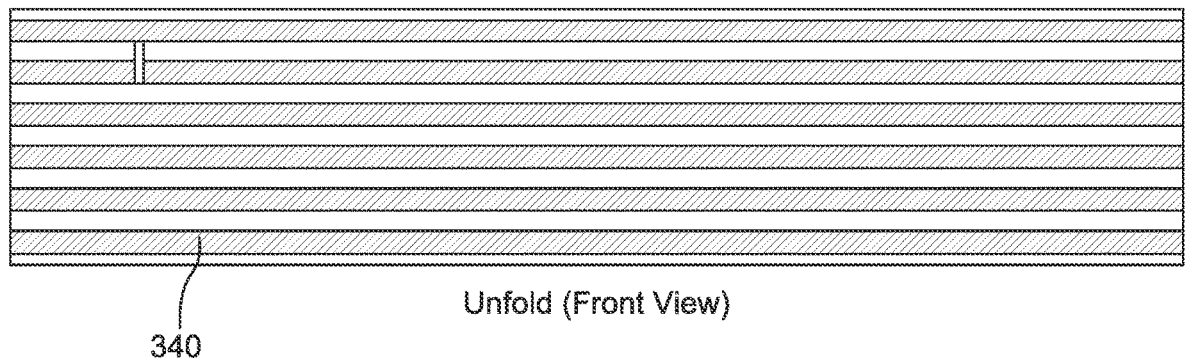
FIG. 4 is a front view of a foldable cover of the vehicle of FIG. 1, according to an exemplary embodiment.
Figure 5:
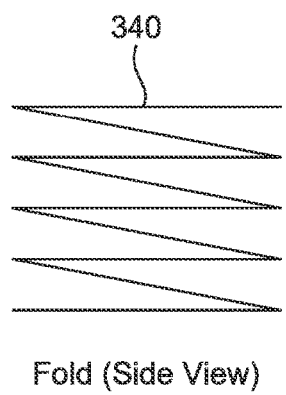
FIG. 5 is a side view of the foldable cover of FIG. 4, according to an exemplary embodiment.

Referring now to FIGS. 3-5, the base 330 can include a foldable cover 340 positioned at least partially above the first door panel 305 and extending between a first pair of guide tubes 335 (e.g., between first guide tube 335a and second guide tube 335b shown in FIG. 3). In some embodiments, the foldable cover 340 includes at least one portion coupled to the first guide tube 335a and at least one portion coupled to the second guide tube 335b such that movement of the first guide tube 335a and the second guide tube 335b (e.g., movement of each inner rod of the guide tubes) causes movement of the foldable cover 340. For example, the foldable cover 340 may not be exposed when the inner rod 605 of the first guide tube 335a is in the retracted position. The foldable cover 340 may be exposed and/or fully extended in the fully extended position. For example, the foldable cover 340 may include at least one elongated portion (e.g., unfolded) in the fully extended position, as shown in FIG. 4.

In some embodiments, the foldable cover 340 can include a plurality of perforations or panels to fold upon movement of the first guide tube 335a and the second guide tube 335b from the fully extend position to the retracted position, as shown in FIG. 5. For example, a top portion of the foldable cover 340 may couple to a top portion of an inner rod and a bottom portion of the foldable cover 340 may couple to a portion of the fixed outer tube 610 and/or to a top portion of the first door panel 305 such that movement of the inner rod 605 causes a top portion of the folded foldable cover 340 to move and a bottom portion of the folded foldable cover 340 to remain in place. Accordingly, the movement causes one or more folds of the foldable cover 340 to extend to an unfolded position such that the foldable cover 340 extends. Thus, in some embodiments, a maximum height (e.g., in a direction parallel to the length of the guide tubes 335) of the foldable cover 340 in the fully extended position may be much greater than a maximum height of the foldable cover 340 in the retracted position. The foldable cover 340 can be made from various materials including, but not limited to, sheet metal. In some embodiments, the upper portion of the vehicle 100 may include one or more storage spaces (e.g., openings, slots, etc.) for the folded foldable cover 340 to store above the first window 355a in the retracted position. In such circumstances, when the foldable cover 340 is in the retracted position, the foldable cover 340 may not interfere with (e.g., cover) at least one portion of the first window 355a such that the cabin 115 is exposed through the first window 355a.

The base 330 can include a panel cover 345 positioned at least partially above the body panel 310 and extending between a second pair of guide tubes 335 (e.g., between second guide tube 335b and third guide tube 335c). In some embodiments, the panel cover 345 includes at least one portion coupled to the second guide tube 335b and at least one portion coupled to the third guide tube 335c such that movement of the second guide tube 335b and the third guide tube 335c (e.g., movement of each inner rod of the guide tubes) causes movement of the panel cover 345. For example, the panel cover 345 may not be exposed when the inner rod 605 of the second guide tube 335b is in the retracted position. The panel cover 345 may be exposed and/or fully extended in the fully extended position. For example, the panel cover 345 may be configured to slide into a portion of the body panel 310 (e.g., into an opening, slot, or similar aperture within the body panel 310).

One or more top portions of the panel cover 345 may couple to a top portion of each inner rod of the second and third guide tubes and one or more bottom portions of the panel cover 345 may couple to a bottom portion of each inner rod of the second and third guide tubes such that movement of the second and third guide tubes causes movement of the panel cover 345 (e.g., as the inner rod moves between the retracted position and the fully extended position, the panel cover 345 can move from a retracted position within the body panel 310 to an exposed position at least partially outside the body panel 310). Accordingly, the movement causes the panel cover 345 to slide from within a portion of the body panel 310 to a portion at least partially outside the body panel 310 when moving between the retracted and fully extended positions. In some embodiments, the upper portion of the vehicle 100 may include one or more storage spaces (e.g., openings, slots, etc.) for the folded foldable cover 340 to store proximate or adjacent to a portion of the second window 355b in the retracted position. In such circumstances, when the panel cover 345 is in the retracted position, the panel cover 345 may be stored proximate a portion of the second window 355b. The panel cover 345 can be formed of various materials including, but not limited to, sheet metal and/or plastic.

Figure 6:
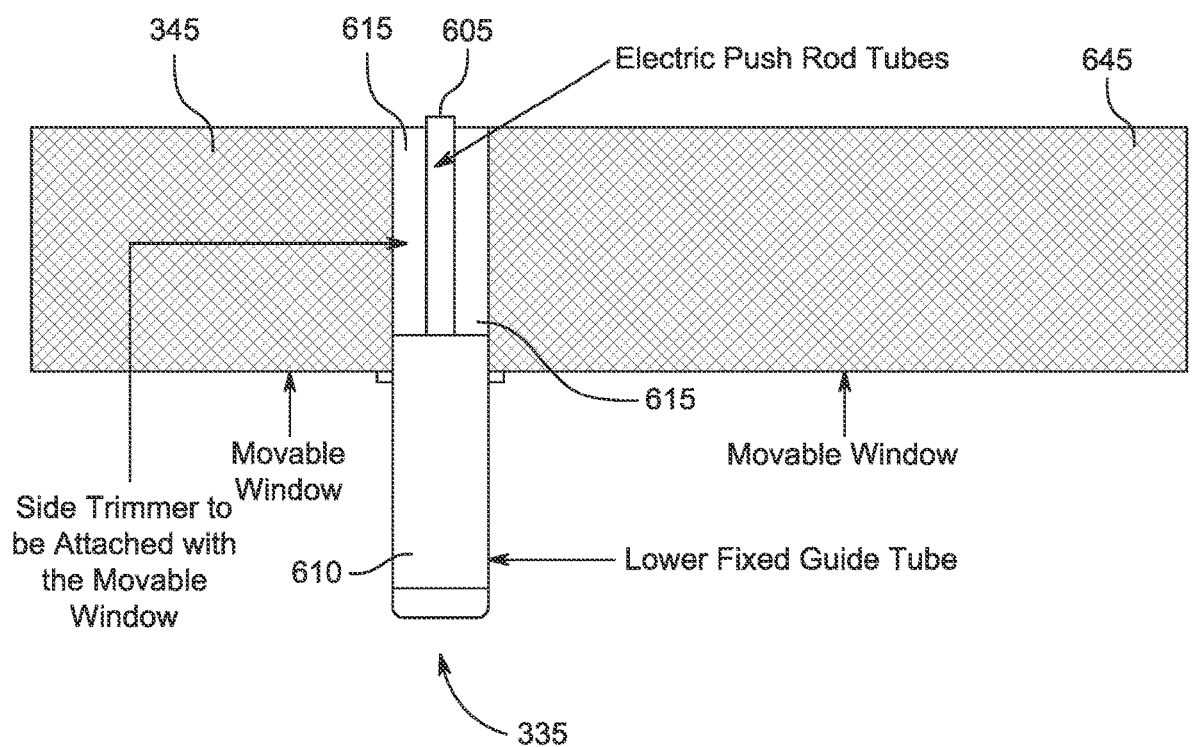
FIG. 6 is a schematic of a portion of a roof adjustment assembly, according to an exemplary embodiment.
Figure 7:
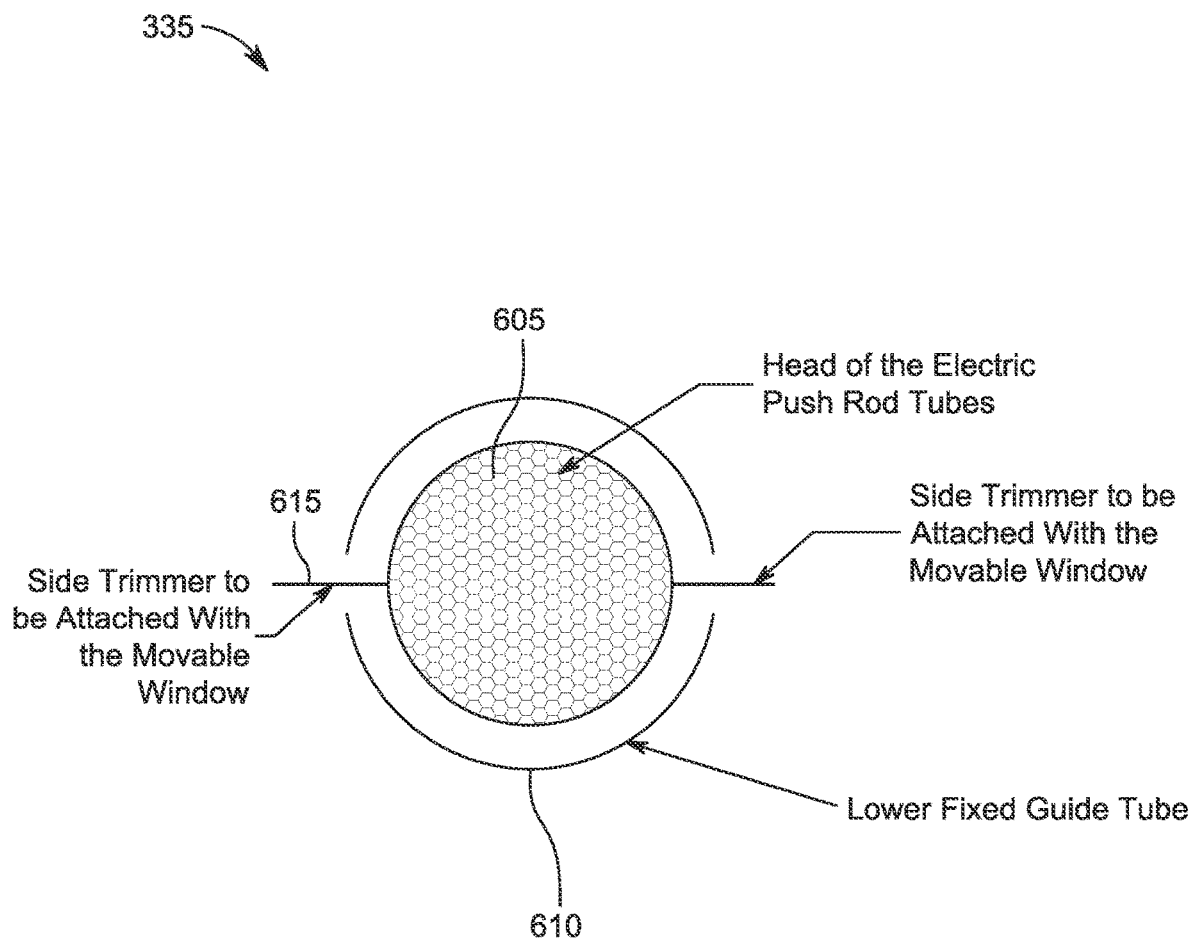
FIG. 7 is a schematic of a portion of a roof adjustment assembly, according to an exemplary embodiment.

Referring now to FIGS. 6 and 7, at least one guide tube 335 (e.g., the third guide tube 335c) can include one or more trimmers 615 to facilitate coupling the panel cover 345 to the guide tube. For example, as shown in FIG. 6, the side trimmer 615 can extend adjacent to a portion of the inner rod 605 of a guide tube 335 between a bottom portion of the inner rod 605 towards a top portion of the inner rod 605. Accordingly, the panel cover 345 can couple to the inner rod 605 through the side trimmer 615 along the length of the side trimmer 615. In some embodiments, the corresponding outer tube 610 can include at least one opening or slot along a length of the outer tube 610 such that the side trimmer 615 can move with movement of the inner rod 605 between the retracted position and the fully extended position (e.g., such that a portion of the trimmer 615 can slide into the slot). In some embodiments, the inner rod 605 can couple to a second trimmer 615, as shown in FIG. 6, such that a second panel cover 645 can couple to the same inner rod 605.

Figure 2:
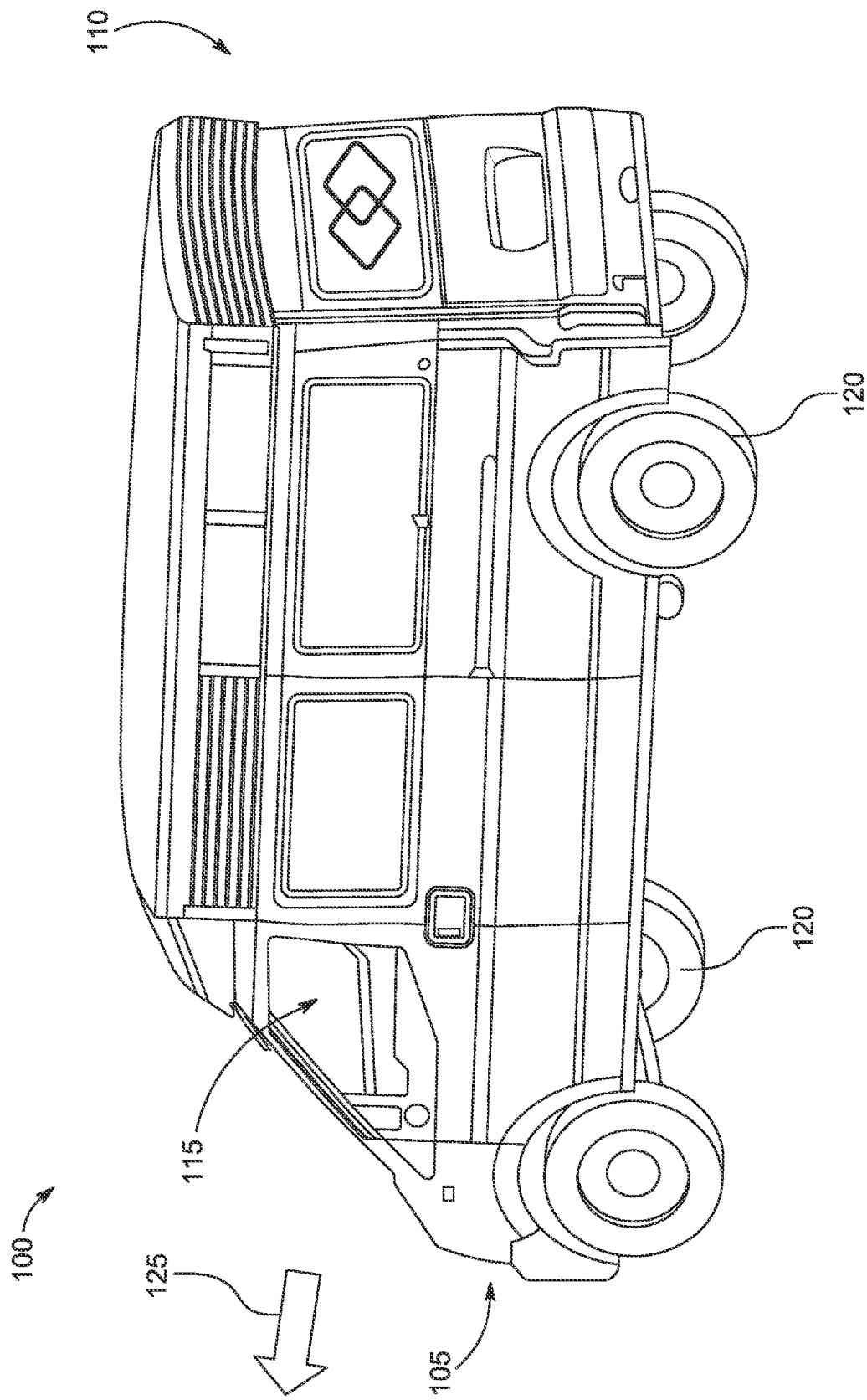
FIG. 2 is a rear perspective view of the vehicle of FIG. 1, according to an exemplary embodiment.

The vehicle 100 can include a roof 350 coupled to a portion of the base 330. For example, the roof 350 can couple to the base 330 such that the roof 350 covers the interior cabin 115. The roof 350 can raise between a lowered position (e.g., the lowered positioned shown in FIG. 1) and a raised position (e.g., the raised position shown in FIG. 2). For example, the roof 350 can couple to the base 330 such that movement of each inner rod 605 of each guide tube 335 causes the roof 350 to move between the lowered position (e.g., when the guide tubes 335 are in the retracted position) and the raised position (e.g., when the guide tubes are in the fully extended position). Accordingly, upward movement of each inner rod 605 of each guide tube 335 can cause the foldable cover 340 to unfold, the panel cover 345 to slide in an upward direction, and/or the roof 350 to rise between the retracted position (e.g., a minimum height of the roof 350) to the fully extended position (e.g., a maximum height of the roof 350).

In some embodiments, the roof adjustment assembly 325 can include one or more beams 360 extending substantially perpendicular to the guide tubes 335. For example, as shown in FIG. 3, the roof adjustment assembly 325 can include four beams 360 extending laterally relative the vehicle 100 to facilitate supporting the roof 350 coupled to the base 330. In some embodiments, the beams 360 may extend longitudinally along the length of the vehicle 100 (e.g., between the front end 105 and the rear end 110).

In some embodiments, the roof adjustment assembly 325 can include one or more seals to facilitate preventing fluid and/or other debris from entering the cabin 115 through the components of the roof adjustment assembly 325. For example, the roof adjustment assembly 325 can include at least one upper seal 365 and at least one lower seal 370. In some embodiments, the upper seal 365 extends longitudinally along a length of the roof 350, as shown in FIG. 3, to facilitate preventing fluids and/or debris from entering the cabin 115. In some embodiments, the upper seal 365 can extend longitudinally between a first side portion of the roof 350 and a second side portion of the roof 350 opposing the first side. In some embodiments, the upper seal 365 extends laterally on a rear portion of the roof 350. In some embodiments, the lower seal 370 extends longitudinally along a length of an upper portion of the vehicle 100 to facilitate preventing fluids and/or debris from entering the cabin 115. In some embodiments, the lower seal 370 can extend longitudinally between a first side portion of the vehicle 100 and a second side portion of the vehicle 100 opposing the first side. In some embodiments, the lower seal 370 extends laterally on a rear portion of the vehicle 100 (e.g., near the rear end 110). The seals can be made from various materials including, but not limited to, rubber, polyurethane, or PTFE.

In some embodiments, the roof adjustment assembly 325 can include one or more additional foldable sections. For example, roof adjustment assembly 325 can include a foldable frontal cover 375 at least partially above the second door panel 315. For example, the foldable frontal cover 375 can extend longitudinally between at least one guide tube 335 (e.g., the first guide tube 335a) and a windshield of the vehicle 100. The foldable frontal cover 375 can extend laterally between a first side pillar section of the vehicle 100 (e.g., from a first side A-pillar) to a second side pillar section of the vehicle 100 (e.g., to a second side A-pillar). The foldable frontal cover 375 can couple to a portion of the vehicle 100 through one or more tracks 380 positioned at an upper portion of each of the side pillar sections, as shown in FIG. 3. The foldable front cover 375 can include one or more perforations, panels, or flexible materials to facilitate folding the front cover 375 from an extended position (e.g., when the guide tubes 335 are fully extended) to a folded position (e.g., when the guide tubes 335 are in the retracted position). In some embodiments, the foldable front cover 375 can be made of sheet metal or plastic to facilitate folding between the extended position to the folded position.

Figure 8:
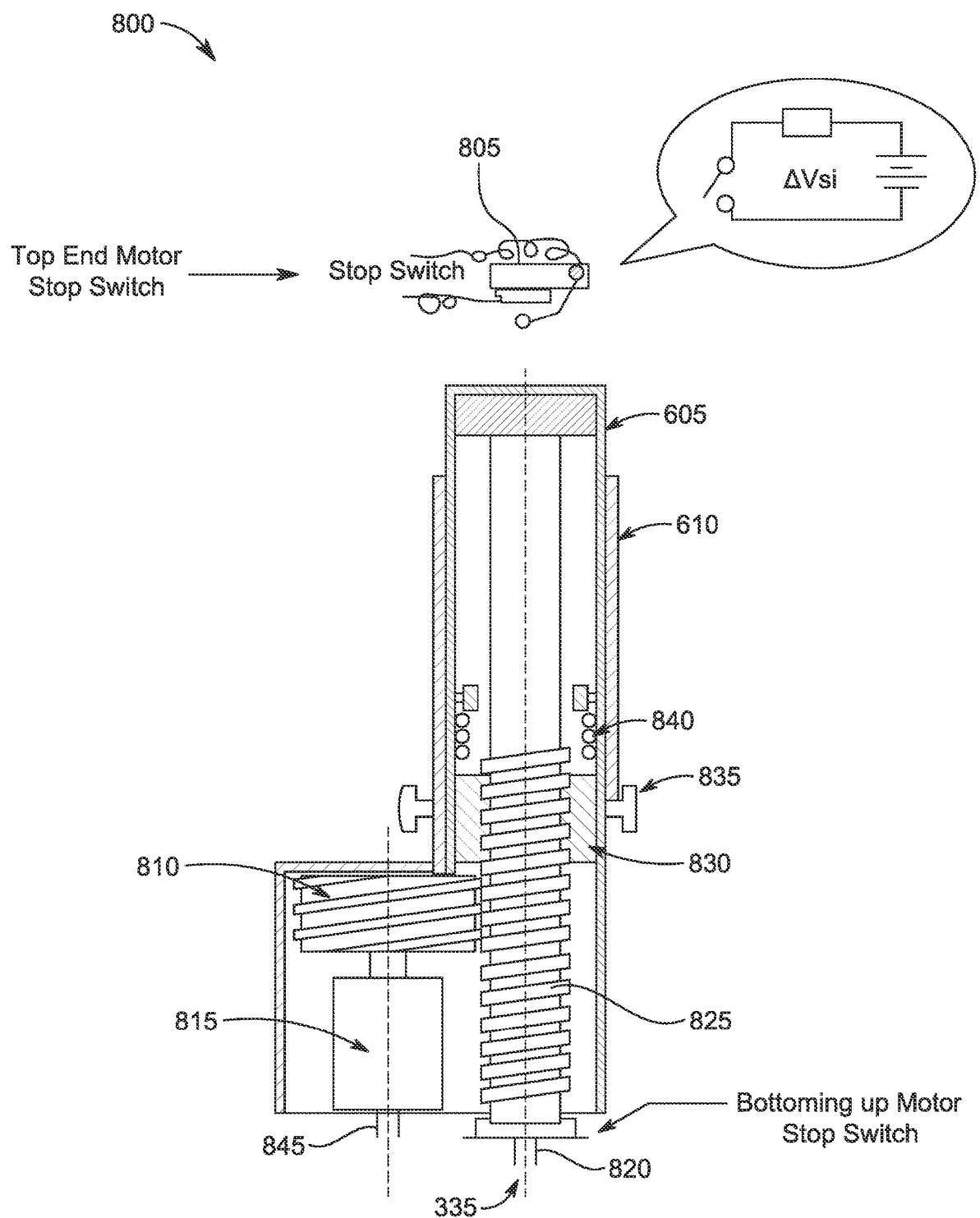
FIG. 8 is a schematic of a portion of a guide tube synchronization system, according to an exemplary embodiment.

Referring now to FIG. 8, at least one guide tube 335 of the plurality of guide tubes 335 can include a motor 815 operably coupled to one or more portions of the guide tube 335. The motor 815 can be or can include various types of motors including, but not limited to, electrical motors or pneumatic motors. The motor 815 can operably couple to a master gear 810. The master gear 810 may be or may include various gears including, but not limited to, spur gears, helical gears, bevel gears, or the like. The master gear 810 can operably couple to a slave gear 825. In some embodiments, the slave gear 825 may be or may include various gears including, but not limited to, spur gears, helical gears, bevel gears, or the like. In some embodiments, the slave gear 825 is a portion of the inner rod 605. For example, the inner rod 605 may include a threaded portion that can engage with one or more portions of the master gear 810 such that rotation of the master gear 810 causes rotation of the inner rod 605. In some embodiments, the slave gear 825 may be or may include a screw that engages with the master gear 810 and abuts a portion (e.g., an end portion) of the inner rod 605 such that rotation of the slave gear 825 causes movement of the inner rod 605 in an up and down direction.

The slave gear 825 facilitates moving the inner rod 605 between the retracted position and the fully extended position. For example, activation of the motor 815 can cause rotation of the master gear 810 which can cause rotation of the slave gear 825 to further cause the inner rod 605 to move. In some embodiments, the guide tube 335 may include one or more components to facilitate fixing the inner rod 605 relative to the outer tube 610, such as a fixed nut 830. For example, one or more screws 835 (e.g., set screws, etc.) can couple a fixed nut 830 to the inner diameter of the inner rod 605 such that the slave gear 825 can move up and/or down with rotation of the slave gear 825 (e.g., each rotation of the slave gear 825 moves the inner rod 605 a pitch of the threads and/or teeth of the slave gear 825. In some embodiments, the guide tube 335 can include one or more elastic components 840 ease of movement of the inner rod 605 relative to the outer tube 610. For example, the elastic components 840 can be or can include a spring. In some embodiments, the motor 815 operably couples to a central controller (described in greater detail below) via one or more wires 845 and/or wireless access points.

Figures 9, 10:
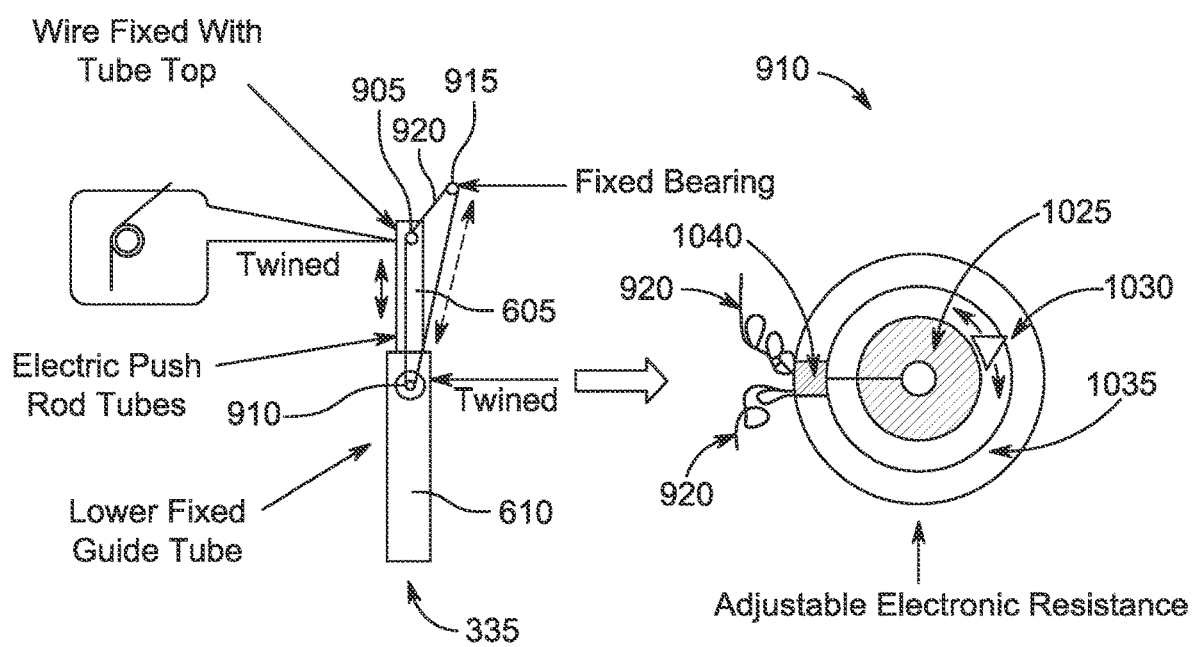
FIG. 9 is a schematic of a portion of a guide tube synchronization system, according to an exemplary embodiment.
FIG. 10 is a schematic of a portion of a guide tube synchronization system, according to an exemplary embodiment.

Referring now to FIGS. 8-11, the roof adjustment assembly 325 of the vehicle 100 can include a guide tube synchronization system 800. The guide tube synchronization system 800 can facilitate movement of each guide tube 335 of the base 330 relative to one another such that each guide tube 335 moves simultaneously to raise the roof 350 (e.g., such that the roof 350 does not tilt). For example, the guide tube synchronization system 800 can include at least one motion sensor coupled to a portion of a guide tube 335 of the plurality of guide tubes 335. The motion sensor can detect movement of the inner rod 605 relative to the outer tube 610 of the guide tube 335. For example, a guide tube 335 can include a first motion sensor 905 and a second motion sensor 910 coupled to a portion of the guide tube 335, as shown in FIG. 9. In some embodiments, the second motion sensor 910 can be or can include a potentiometer. In some embodiments, the guide tube 335 can include a third motion sensor 915 coupled to a portion of the guide tube 335. In some embodiments, the guide tube 335 includes one or more wires 920 wrapped around or otherwise coupled to a portion of one or more of the motion sensors. For example, the wires 920 can wrap around one or more portions of each motion sensor to operate like a pulley system. As the inner rod 605 moves up and/or down relative to the outer tube 610, the wires 920 can rotate about each motion sensor. In some embodiments, the first motion sensor 905 couples to a portion of the inner rod 605 and the second motion sensor 910 couples to a portion of the outer tube 610 such that movement of the inner rod 605 causes movement of the wire 920 relative to a fixed point (e.g., relative to the second motion sensor 910 as shown in FIG. 9).

In some embodiments, rotation of the wires 920 creates a change in variable resistance. For example, FIG. 10 shows the second motion sensor 910 in greater detail. As shown in FIG. 10, the wires 920 can wrap around a rotatable switch 1025. As the wire 920 rotates about the rotatable switch 1025 (e.g., as the inner rod 605 moves up or down), one or more portions of the second motion sensor 910 engage with a contact point 1030, which causes the variable resistance of the motion sensor 910 (e.g., via resistance element 1035) to change. In some embodiments, one or more insulation components 1040 may surround least a portion of the wires 920.

The guide tube synchronization system 800 can include at least one stop switch. For example, as shown in FIG. 8, the guide tube synchronization system 800 can include a top end stop switch 805 and a bottom end stop switch 820. The top end stop switch 805 can be or can include various stop switches including, but not limited to, push button switches or pressure switches. The bottom end switch 820 can be or can include various stop switches including, but not limited to, push button switches or pressure switches. In some embodiments, the top end stop switch 805 and the bottom end stop switch 820 may be the same. In some embodiments, the top end stop switch 805 and the bottom end stop switch 820 may be different.

Each of the top end switch 805 and the bottom end switch 820 can detect when an inner rod 605 of a guide tube 335 has reached a maximum height (e.g., in the fully extended position). For example, the top end switch 805 can position proximate a top end of the inner rod 605 (e.g., towards the roof 350) to detect the inner rod 605 has reached its maximum height at the top end of the inner rod 605 (e.g., the top end of the inner rod 605 makes contact with the top end switch 805). The bottom end switch 820 can position proximate the bottom end of the inner rod 605 (e.g., towards the wheels 120 of the vehicle 100) to detect the inner rod 605 has reached its maximum height at the bottom end of the inner rod 605 (e.g., the bottom end switch 820 makes contact with the top end of the outer tube 610 when the inner rod 605 has reached its maximum height).

Figure 11:
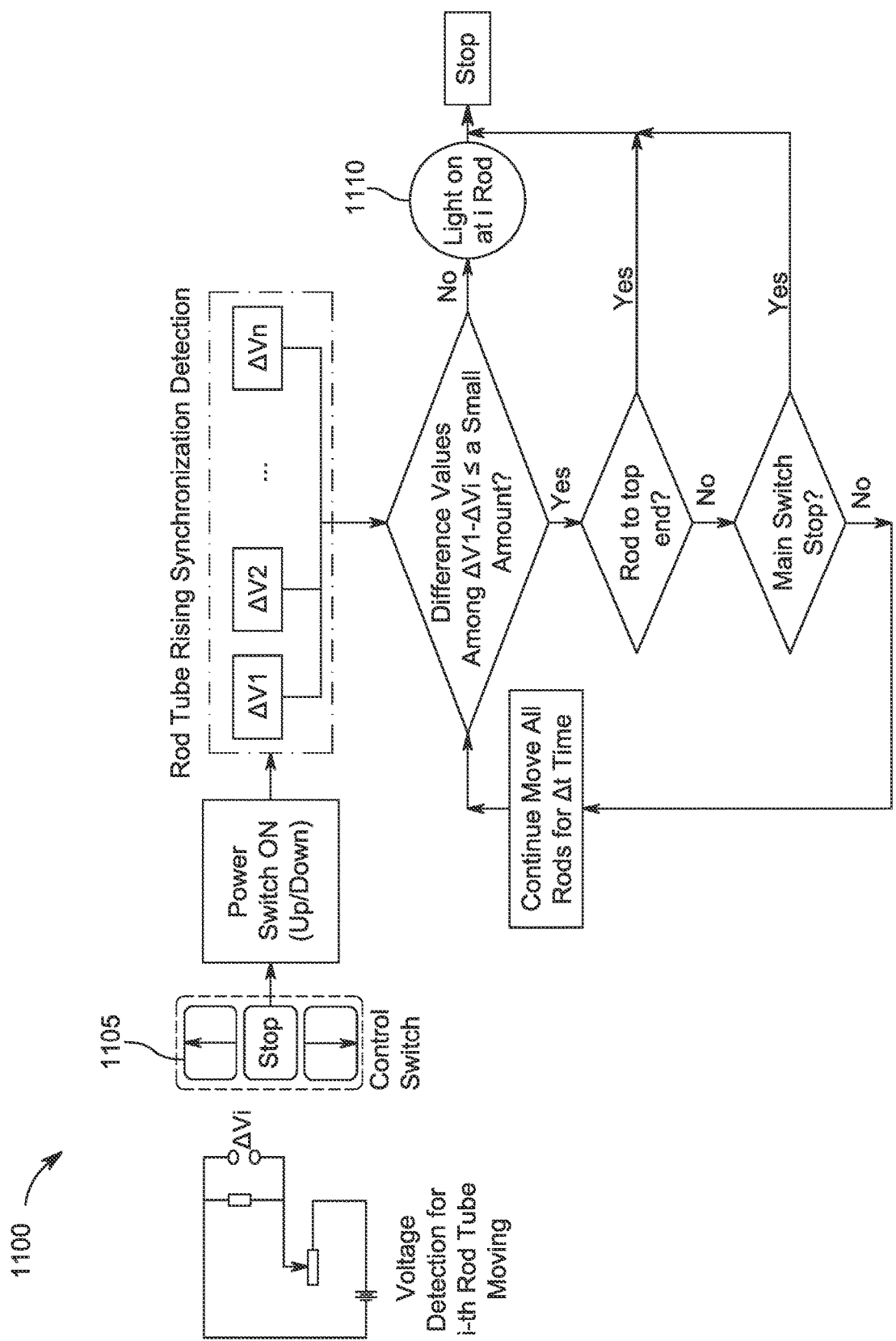
FIG. 11 is a schematic of a portion of a guide tube synchronization system, according to an exemplary embodiment.

The guide tube synchronization system 800 can include a central controller to facilitate controlling the guide tube synchronization system 800. For example, FIG. 11 shows a schematic example of a central controller 1100. The central controller 1100 can receive one or more first signals from the one or more motion sensors corresponding to a variable resistance of a first guide tube 335. The central controller 1100 can receive one or more second signals from the one or more motion sensors corresponding to a variable resistance of a second guide tube 335. The central controller 1100 can determine a difference between movement of the first guide tube 335 and the second guide tube 335 based on the first and second signals. For example, the central controller 1100 can determine a voltage measurement of the first guide tube 335 based on the first signal and a voltage measurement of the second guide tube 335 based on the second signal. The central controller 1100 can determine a difference between the voltage measurements. If the central controller 1100 determines that the difference between the voltage measurements meets a predetermined threshold (e.g., indicating that the first guide tube and the second guide tube are not moving within a predetermined rate of one another), the central controller 1100 can transmit an indication to stop movement of the first and/or second guide tubes 335. If the central controller 1100 determines that the difference between the voltage measurements does not meet a predetermined threshold (e.g., indicating that the first guide tube and the second guide tube are moving within a predetermined rate of one another), the central controller 1100 can transmit an indication to maintain movement of the first and/or second guide tubes 335.

As each of the inner rods 605 of the first guide tube 335 and second guide tube 335 continue to move (e.g., after the central controller 1100 determines that the difference between the voltage measurements does not meet a predetermined threshold), the top end stop switch 805 and the bottom end stop switch 820 can facilitate controlling the positioning of each guide tube 335 relative to one another. In other words, while the motion sensors facilitate detecting that the guide tubes are moving at the same rate and/or speed, the stop switches facilitate determining that the guide tubes are at the same height. The central controller 1100 can receive signals from the top end stop switch 805 and the bottom end stop switch 820. For example, if a top portion of the inner rod 605 engages with (e.g., touches, activates, etc.) the top end switch 805, the top end switch 805 can transmit a signal to the central controller 1100 indicating that the inner rod 605 has reached its maximum height. The central controller 1100 can transmit a signal corresponding to an indication to stop one or more of the plurality of guide tubes 335. Similarly, if a top portion of the outer tube 610 engages with (e.g., touches, activates, etc.) the bottom end switch 820, the bottom end switch 820 can transmit a signal to the central controller 1100 indicating that the inner rod 605 has reached its maximum height. The central controller 1100 can transmit a signal corresponding to an indication to stop one or more of the plurality of guide tubes 335. In this manner, if a first guide tube 335 reaches its maximum height before a second guide tube 335 reaches its maximum height, the central controller 1100 can stop movement of the first guide tube 335.

In some embodiments, the vehicle 100 can include an activation switch (e.g., shown as activation switch 1105 in FIG. 11) within the vehicle 100 to receive a user input to activate and/or stop the plurality of guide tubes 335. For example, the activation 1105 switch may include or may be various switches including, but not limited to, a toggle switch, a push button switch, or the like. In this manner, a user of the vehicle 100 can activate movement of one or more guide tubes 335 and can similarly stop movement of one or more guide tubes 335 via a user input to the activation switch 1105. In some embodiments, the vehicle 100 may include one or more indications 1110 (e.g., lights, sounds, graphical user interfaces, etc.) that indicates malfunction of a specific guide tube of the plurality of guide tubes 335. For example, if one guide tube 335 is not working properly, the guide tube 335 (e.g., the motion sensor) can transmit a signal to the controller 1100 including an identifier of the specific guide tube 335. The controller 1100 can provide the indication of the guide tube malfunction to a user of the vehicle 100.

Figure 12:
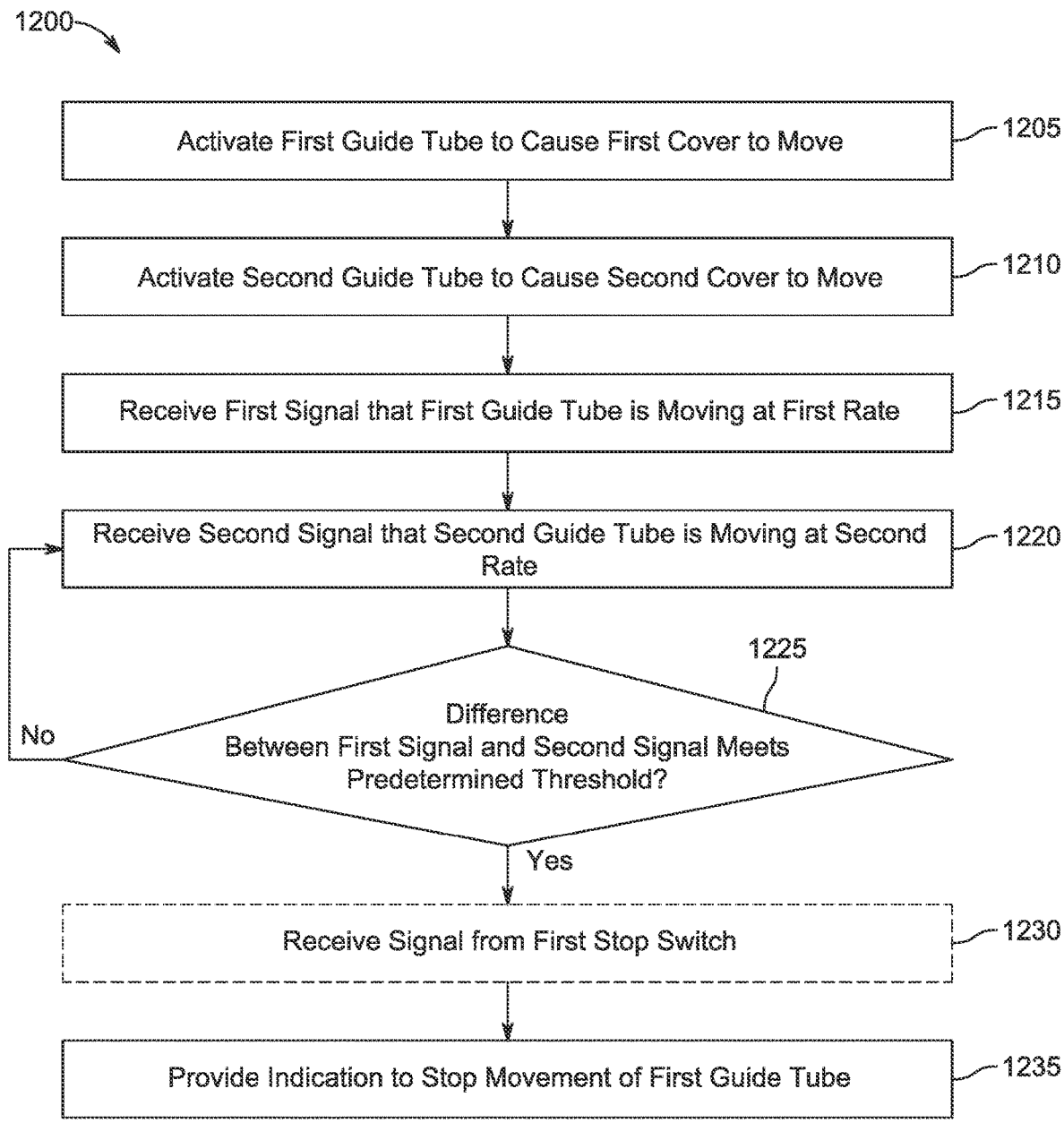
FIG. 12 is a flow chart illustrating of a process of adjusting roof height in a vehicle, according to an exemplary embodiment.

FIG. 12 depicts an illustration of a method 1200 of controlling a roof adjustment assembly 325, according to an embodiment. The method 1200 can be performed by the various components described above in reference to FIGS. 1-10. As a brief overview, a central controller 1100 of a guide tube synchronization system 800 of the roof adjustment assembly 325 can activate a first guide tube 335 to cause a first cover (e.g., a foldable cover 340) to move at step 1205. At step 1210, the central controller 1100 can activate a second guide tube 335 to cause a second cover (e.g., a panel cover 345) to move. At step 1215, the central controller 1100 can receive a first signal that indicates that the first guide tube 335 is moving at a first rate. At step 1220, the central controller 1100 can receive a second signal that indicates that the second guide tube 335 is moving at a second rate. At step 1225, the central controller 1100 can determine if the difference between the first signal and the second signal meets a predetermined threshold. After determining that the difference between the first signal and the second signal meets a predetermined threshold, the central controller 1100 can proceed to optional step 1230 and can receive a signal from a stop switch. The central controller 1100 can alternatively and/additionally proceed to step 1235 to provide an indication to stop movement of the first guide tube. If the central controller 1100 determines that the difference between the first signal and the second signal does not meet a predetermined threshold, the central controller 1100 can return to step 1220.

In greater detail, at step 1205, the central controller 1100 of the guide tube synchronization system 800 can active the first guide tube 335. In some embodiments, the central controller 1100 can activate the first guide tube 335 by receiving a user input to an activation switch 1105 (e.g., an "on" switch) within a vehicle 100. In response to receiving an activation signal, the central controller 1100 can transmit a control signal to the first guide tube 335 to cause an inner rod 605 of the first guide tube 335 to move relative to an outer tube 610 of the first guide tube 335. In some examples, the inner rod 605 moves in an upward direction (e.g., away from the wheels 120 when the vehicle 100 is operating in normal conditions). In some embodiments, the central controller 1100 can transmit a signal to a motor 815 operably coupled to the first guide tube 335 to cause the inner rod 605 of the first guide tube 335 to move.

At step 1210, the central controller 1100 can activate the second guide tube 335. In some embodiments, the central controller 1100 can active the first guide tube 335 and the second guide tube 335 simultaneously (e.g., such that steps 1205 and 1210 occur at the same time). In some embodiments, the central controller 1100 can activate the second guide tube 335 by receiving a user input to the activation switch 1105. In response to receiving an activation signal, the central controller 1100 can transmit a control signal to second first guide tube 335 to cause an inner rod 605 of the second guide tube 335 to move relative to an outer tube 610 of the second guide tube 335. In some examples, the inner rod 605 moves in an upward direction (e.g., away from the wheels 120 when the vehicle 100 is operating in normal conditions). In some embodiments, the central controller 1100 can transmit a signal to a motor 815 operably coupled to the second guide tube 335 to cause the inner rod 605 of the second guide tube 335 to move.

At step 1215, the central controller 1100 can receive a first signal indicating that the first guide tube 335 is moving at a first rate. For example, as described in greater detail above, a motion sensor (e.g., motion sensor 910) operably coupled to a portion of the first guide tube 335 can detect a change in variable resistance of a wire 920 operably coupled to a portion of the first guide tube 335. In some embodiments, the variable resistance may correspond to a rate of movement of the inner rod 605 of the first guide tube 335. The central controller 1100 can receive the first signal from the motion sensor that corresponds to a first rate of movement (e.g., a first change in variable resistance) of the inner rod 605 of the first guide tube 335.

At step 1220, the central controller 1100 can receive a second signal indicating that the second guide tube 335 is moving at a second rate. For example, as described in greater detail above, a motion sensor operably coupled to a portion of the second guide tube 335 can detect a change in variable resistance of a wire 920 operably coupled to a portion of the second guide tube 335. In some embodiments, the variable resistance may correspond to a rate of movement of the inner rod 605 of the second guide tube 335. The central controller 1100 can receive the second signal from the motion sensor that corresponds to a second rate of movement (e.g., a second change in variable resistance) of the inner rod 605 of the second guide tube 335. In some embodiments, the central controller 1100 can receive the first signal and the second signal simultaneously (e.g., such that steps 1215 and 1220 occur at the same time).

At step 1225, the central controller 1100 can determine if a difference between the first signal and the second signal meets and/or exceeds a predetermined threshold. In response to determining that the difference does not meet and/or exceed the predetermined threshold, the central controller 1100 can return to step 1220 and/or step 1215 and continue to receive the first and/or second signals from the motion sensors. In response to determining that the difference does meet and/or exceed the predetermined threshold, the central controller 1100 can proceed to optional step 1230 and can optionally receive a signal from a stop switch. As described in greater detail above, the central controller 1100 can receive at least one signal from a stop switch, such as a top end stop switch 805, a bottom end top switch 820, and/or the activation switch 1105. Alternatively and/or additionally, the central controller 1100 can proceed to step 1235 and can provide an indication to stop movement of the first guide tube 335. For example, the central controller 1100 can transmit a signal to the motor 815 operably coupled to the inner rod 605 of the first guide tube 335 to stop movement of the inner rod 605. In some embodiments, the central controller 1100 can additionally and/or alternatively transmit an indication to stop movement of the second guide tube 335 either simultaneously or after transmitting an indication to stop movement of the first guide tube 335 (e.g., such that the central controller 1100 can stop movement of one or all of the guide tubes 335).

Figure 13:
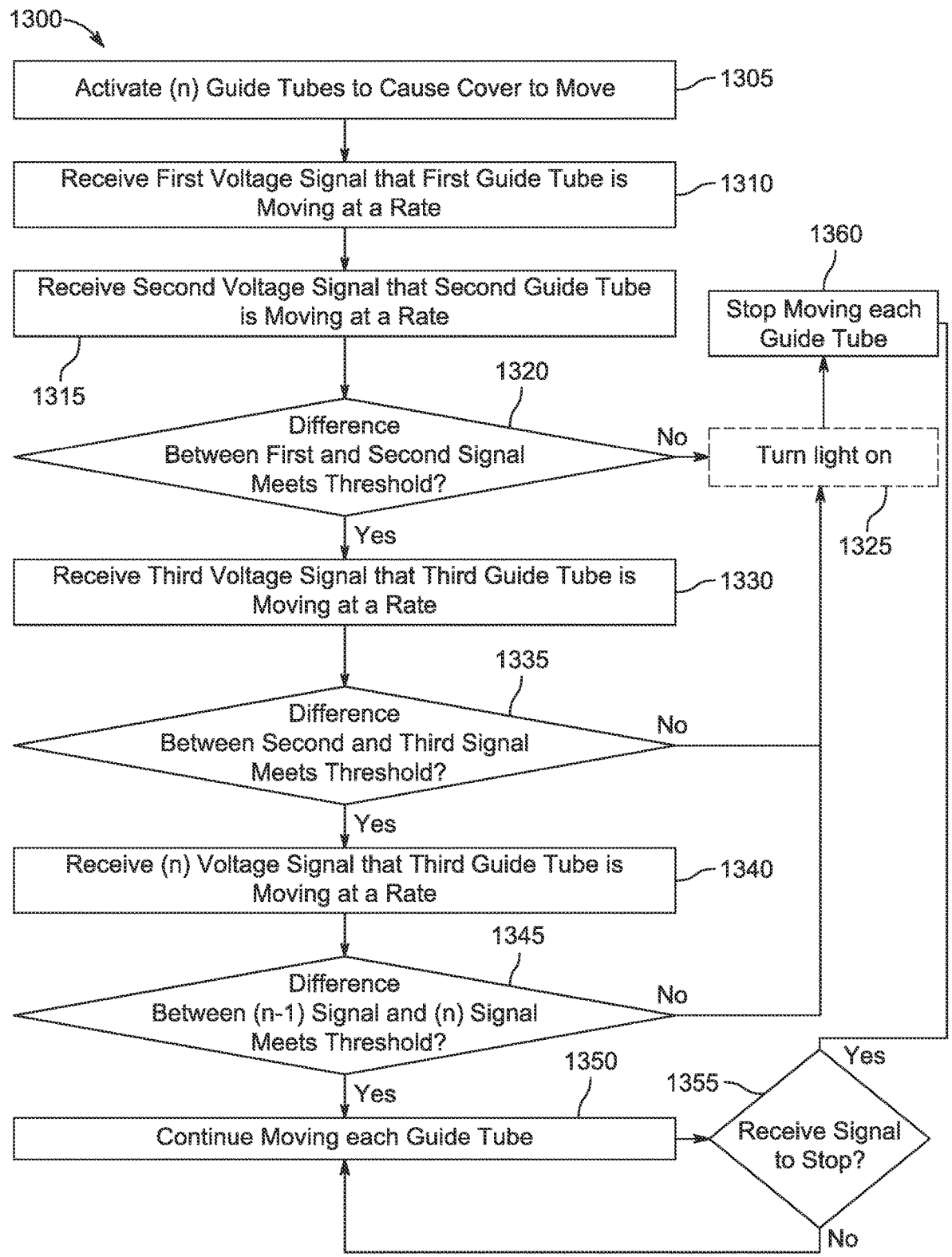
FIG. 13 is a flow chart illustrating a process of adjusting roof height in a vehicle, according to an exemplary embodiment.

FIG. 13 depicts an illustration of a method 1300 of controlling a roof adjustment assembly 325, according to an embodiment. The method 1300 can be performed by the various components described above in reference to FIGS. 1-10. As a brief overview, at step 1305, a central controller 1100 of a guide tube synchronization system 800 of the roof adjustment assembly 325 can activate N number of guide tubes 335 to cause a first cover (e.g., a foldable cover 340) to move. At step 1310, the central controller 1100 can receive a first signal that indicates that a first guide tube 335 of the N number of guide tubes 335 is moving at a first rate. At step 1315, the central controller 1100 can receive a second signal that indicates that a second guide tube 335 of the N number of guide tubes 335 is moving at a second rate. At step 1320, the central controller 1100 can determine if the difference between the first signal and the second signal meets a predetermined threshold. After determining that the difference between the first signal and the second signal does not meet a predetermined threshold, the central controller 1100 can proceed to optional step 1325, where the central controller 1100 can cause activation of at least one indication 1110 of the first guide tube 335 or the second guide tube 335. The central controller 1100 can additionally and/or alternatively proceed to step 1360, where the central controller 1100 causes the guide tubes 335 to stop moving. After determining that the difference between the first signal and the second signal meets a predetermined threshold, the central controller 1100 can proceed to step 1330, where the central controller 1100 can receive a third signal that indicates that a third guide tube 335 of the N number of guide tubes 335 is moving at a third rate.

Continuing with the brief overview, at step 1335 the central controller 1100 can determine if the difference between the second signal and the third signal meets a predetermined threshold. After determining that the difference between the second signal and the third signal meets a predetermined threshold, the central controller 1100 can proceed to step 1340, where the central controller 1100 can continue to receive a fourth through N number of signals that indicate that a fourth through N number of guide tubes 335 is moving at a fourth through N rates. After determining that the difference between the (Nth−1) signal and the Nth signal meets a predetermined threshold, the central controller 1100 can proceed to step 1350, where the central controller 1100 continues to cause the guide tubes 335 to move. For each of steps 1335 through 1345, if the central controller 1100 determines that the difference between the signals does not meet the predetermined threshold, the central controller 1100 may proceed to optional step 1325 and/or step 1360. At step 1355, the central controller 1100 can determine if the central controller 1100 receives a signal to stop. After determining that the central controller 1100 received a signal to stop, the central controller 1100 can proceed to step 1360. After determining that the central controller 1100 did not receive a signal to stop, the central controller 1100 can return to step 1350.

In greater detail, at step 1305, the central controller 1100 of the guide tube synchronization system 800 can active the N number of guide tubes 335. For example, if a vehicle 100 includes eight guide tubes 335, the central controller 1100 can activate each of the 8 guide tubes (in this case N=8). The vehicle 100 can include various amounts of guide tubes 335. In some embodiments, the central controller 1100 can activate each guide tube 335 by receiving a user input to an activation switch 1105 (e.g., an "on" switch) within the vehicle 100. In response to receiving an activation signal, the central controller 1100 can transmit a control signal to each of the guide tubes 335 to cause an inner rod 605 of each guide tube 335 to move relative to an outer tube 610 of each guide tube 335. In some examples, the inner rod 605 moves in an upward direction (e.g., away from the wheels 120 when the vehicle 100 is operating in normal conditions). In some embodiments, the central controller 1100 can transmit a signal to one or more motors 815 each operably coupled to each guide tube 335 to cause the inner rod 605 of each guide tube 335 to move.

At step 1310, the central controller 1100 can receive a first voltage signal indicating that a first guide tube 335 of the N number of guide tubes 335 is moving at a first rate. For example, as described in greater detail above, a motion sensor (e.g., motion sensor 910) operably coupled to a portion of the first guide tube 335 can detect a change in variable resistance of a wire 920 operably coupled to a portion of the first guide tube 335. In some embodiments, the variable resistance may correspond to a rate of movement of the inner rod 605 of the first guide tube 335. The central controller 1100 can receive the first signal from the motion sensor that corresponds to a first rate of movement (e.g., a first change in variable resistance) of the inner rod 605 of the first guide tube 335.

At step 1315, the central controller 1100 can receive a second voltage signal indicating that a second guide tube 335 of the N number of guide tubes 335 is moving at a second rate. For example, as described in greater detail above, a motion sensor operably coupled to a portion of the second guide tube 335 can detect a change in variable resistance of a wire 920 operably coupled to a portion of the second guide tube 335. In some embodiments, the variable resistance may correspond to a rate of movement of the inner rod 605 of the second guide tube 335. The central controller 1100 can receive the second signal from the motion sensor that corresponds to a second rate of movement (e.g., a second change in variable resistance) of the inner rod 605 of the second guide tube 335. In some embodiments, the central controller 1100 can receive the first signal and the second signal simultaneously (e.g., such that steps 1310 and 1315 occur at the same time).

At step 1320, the central controller 1100 can determine if a difference between the first signal and the second signal meets and/or exceeds a predetermined threshold. In response to determining that the difference does meet and/or exceed the predetermined threshold, the central controller 1100 can proceed to step 1330 to continue to receive additional signals from motion sensors of the remaining N number of guide tubes 335. For example, meeting the predetermined threshold may indicate that the first guide tube 335 and the second guide tube 335 are moving at about equal rates (e.g., the first rate is about the same as the second rate). In response to determining that the difference does not meet and/or exceed the predetermined threshold, the central controller 1100 can proceed to optional step 1325 and can activate at least one indication 1110 (e.g., a light) operably coupled to one or more guide tubes 335. For example, not meeting the predetermined threshold may indicate that the first guide tube 335 is moving at a different rate than the second guide tube 335 (e.g., the first rate does not equal the second rate). Accordingly, the central controller 1100 may activate a light associated with one or both of the first and second guide tubes 335, such that a user of the vehicle 100 can detect which of the guide tubes 335 is not functioning properly. The central controller 1100 can additionally and/or alternatively proceed to step 1360 such that the central controller 1100 causes the guide tubes 335 to stop moving, as described in greater detail above.

At step 1330, the central controller 1100 can receive a third voltage signal indicating that a third guide tube 335 of the N number of guide tubes 335 is moving at a third rate. For example, as described in greater detail above, a motion sensor operably coupled to a portion of the third guide tube 335 can detect a change in variable resistance of a wire 920 operably coupled to a portion of the third guide tube 335. In some embodiments, the variable resistance may correspond to a rate of movement of the inner rod 605 of the third guide tube 335. The central controller 1100 can receive the third signal from the motion sensor that corresponds to a third rate of movement (e.g., a third change in variable resistance) of the inner rod 605 of the third guide tube 335. In some embodiments, the central controller 1100 can receive the second signal and the third signal simultaneously (e.g., such that steps 1315 and 1330 occur at the same time).

At step 1335, the central controller 1100 can determine if a difference between the second signal and the third signal meets and/or exceeds a predetermined threshold. In response to determining that the difference does meet and/or exceed the predetermined threshold, the central controller 1100 can proceed to step 1340 to continue to receive additional signals from motion sensors of the remaining N number of guide tubes 335. For example, meeting the predetermined threshold may indicate that the second guide tube 335 and the third guide tube 335 are moving at about equal rates (e.g., the second rate is about the same as the third rate). In response to determining that the difference does not meet and/or exceed the predetermined threshold, the central controller 1100 can proceed to optional step 1325 and can activate at least one indication 1110 (e.g., a light) operably coupled to one or more guide tubes 335. For example, not meeting the predetermined threshold may indicate that the second guide tube 335 is moving at a different rate than the third guide tube 335 (e.g., the second rate does not equal the third rate). Accordingly, the central controller 1100 may activate a light associated with one or both of the second and third guide tubes 335, such that a user of the vehicle 100 can detect which of the guide tubes 335 is not functioning properly. The central controller 1100 can additionally and/or alternatively proceed to step 1360 such that the central controller 1100 causes the guide tubes 335 to stop moving, as described in greater detail above.

The central controller 1100 can repeat the steps of receiving a voltage signal and determining a difference between the received voltage signals. For example, at step 1340, the central controller 1100 can receive a fourth voltage signal indicating that a fourth guide tube 335 of the N number of guide tubes 335 is moving at a fourth rate. For example, as described in greater detail above, a motion sensor operably coupled to a portion of the fourth guide tube 335 can detect a change in variable resistance of a wire 920 operably coupled to a portion of the fourth guide tube 335. In some embodiments, the variable resistance may correspond to a rate of movement of the inner rod 605 of the fourth guide tube 335. The central controller 1100 can receive the fourth signal from the motion sensor that corresponds to a fourth rate of movement (e.g., a fourth change in variable resistance) of the inner rod 605 of the fourth guide tube 335. In some embodiments, the central controller 1100 can receive the third signal and the fourth signal simultaneously (e.g., such that steps 1330 and 1340 occur at the same time). The central controller 1100 can continue this process until the central controller 1100 receives an Nth voltage signal or until the central controller 1100 receives an indication to stop the guide tubes 335. For example, if the vehicle 100 includes eight guide tubes 335, the central controller 1100 can receive signals from the eight guide tubes 335 and determine a difference between the (Nth−1) signal and the Nth signal, at step 1345. By way of example, if N=8, N−1=7. Accordingly, the central controller 1100 can determine a difference between the received voltage signals of the seventh guide tube 335 and the eight guide tube 335. Similarly, the central controller 1100 can determine a difference between the received voltage signals of the sixth guide tube 335 and the seventh guide tube 335, the fifth guide tube 335, and the sixth guide tube 335, and the fourth guide tube 335 and the fifth guide tube 335.

At step 1350, the central controller 1100 can cause each guide tube 335 to continue moving. For example, after determining that the difference between each (N−1) and N signals meets the predetermined threshold, the central controller 1100 can continue to transmit control signals to each of the N guide tubes 335 to cause each of the N guide tubes 335 to continue to move.

At step 1355, the central controller 1100 can determine if the central controller 1100 received a signal to stop the guide tubes 335. For example, as described in greater detail above, the central controller 1100 can receive at least one signal from a stop switch, such as a top end stop switch 805, a bottom end top switch 820, and/or the activation switch 1105. After receiving a signal to stop the guide tubes 335, the central controller can proceed to step 1360, where the central controller 1100 can transmit a signal to the motor 815 operably coupled to the inner rods 605 of the each guide tube 335 to stop movement of the inner rods 605. After determining that the central controller 1100 has not received a signal to stop (e.g., no inner rod 605 has engaged a stop switch), the central controller 1100 may return to step 1350 and can continue to cause the guide tubes 335 to move.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, are understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the vehicle 100 and components thereof (e.g., the guide tubes 335, the wheels 120, etc.) as shown in the various exemplary embodiments is illustrative only. Additionally, any element disclosed in one embodiment may be incorporated or utilized with any other embodiment disclosed herein.

What is claimed is:

1. A vehicle, comprising:
   a door panel and a body panel adjacent the door panel;
   a roof adjustment assembly, having:
      a base located at an upper portion of the vehicle, the base having:
         a plurality of guide tubes extending downward from the base, each of the plurality of guide tubes including an outer tube and an inner rod movable between a retracted position and a fully extended position relative to the outer tube,
         a foldable cover positioned at least partially above the door panel and extending between a first pair of guide tubes of the plurality of guide tubes, and
         a panel cover positioned at least partially above the body panel and extending between a second pair of guide tubes plurality of guide tubes;
      a roof coupled to the base; and
      a guide tube synchronization system, comprising:
         a first motion sensor configured to detect movement of a first inner rod relative to a first outer tube of a first guide tube of the plurality of guide tubes,
         a second motion sensor configured to detect movement of a second inner rod relative to a second outer tube of a second guide tube of the plurality of guide tubes,
         a controller configured to receive inputs from the first motion sensor and the second motion sensor;
         wherein the guide tube synchronization system is configured to:
            receive, via the controller, a first signal from the first motion sensor and a second signal from the second motion sensor,
            determine, via the controller, a difference between the first signal and the second signal meets a predetermined threshold, and
            provide, via the controller, an indication to stop the movement of the first inner rod based on the determined difference between the first signal and the second signal.

2. The vehicle of claim 1, wherein the guide tube synchronization system further comprises:
   a first upper limit switch configured to detect the first inner rod is in the fully extended position;
   a second upper limit switch configured to detect the second inner rod is in the fully extended position;
   wherein the controller is further configured to:
      receive, via the controller, a switch signal from at least one of the first upper limit switch or the second upper limit switch; and
      provide, via the controller, an indication to stop the movement of the first inner rod based on the switch signal.

3. The vehicle of claim 1, wherein the first signal from the first motion sensor corresponds to a detected change in resistance of the first motion sensor.

4. The vehicle of claim 1, wherein the guide tube synchronization system further comprises an activation switch operably coupled to a portion of the vehicle and wherein the controller is configured to receive a third signal corresponding to a user input to the activation switch to activate the first inner rod.

5. The vehicle of claim 1, wherein the first guide tube includes a motor operably coupled to a master gear and a slave gear and wherein activation of the motor causes the master gear to cause the slave gear to move the inner rod relative to the outer tube.

6. The vehicle of claim 1, wherein the guide tube synchronization system is further configured to:
   determine, via the controller, a difference between the first signal and the second signal does not meet a predetermined threshold, and
   provide, via the controller, an indication to continue the movement of the first inner rod based on the determined difference between the first signal and the second signal.

7. The vehicle of claim 1, wherein the guide tube synchronization system further comprises:
   a first wire coupled to the first outer tube and the first inner rod;
   a second wire coupled to the second outer tube and the second inner rod;
   wherein the first wire is configured to rotate relative to the first outer tube with movement of the first inner rod relative to the first outer tube;
   wherein the second wire is configured to rotate relative to the second outer tube with movement of the second inner rod relative to the second outer tube; and
   wherein the rotation of each wire causes a change in variable resistance of the wire.

8. The vehicle of claim 7, wherein the difference between the movement of the first inner rod and the second inner rod relative to one another corresponds to a difference in the variable resistance of the first wire and the second wire.

9. A vehicle, comprising:
   a door panel and a body panel adjacent the door panel;
   a roof adjustment assembly, having:
      a base located at an upper portion of the vehicle, the base having:

a plurality of guide tubes extending downward from the base, each of the plurality of guide tubes including an outer tube and an inner rod movable between a retracted position and a fully extended position relative to the outer tube, a foldable cover positioned at least partially above the door panel and extending between a first pair of guide tubes of the plurality of guide tubes, and a panel cover positioned at least partially above the body panel and extending between a second pair of guide tubes of the plurality of guide tubes;

a roof coupled to the base; and wherein the foldable cover is foldable between a storage position and a fully extended position; and wherein the panel cover is moveable between a storage position and a fully extended position.

10. The vehicle of claim 9, wherein at least one of the second pair of guide tubes includes a side trimmer configured to facilitate coupling the panel cover to the inner rod of the at least one guide tube.

11. The vehicle of claim 10, wherein the side trimmer couples a portion of the panel cover to a portion of the inner rod of the at least one guide tube such that movement of the inner rod causes movement of the panel cover.

12. The vehicle of claim 9, wherein a first guide tube of the plurality of guide tubes includes a motor operably coupled to a master gear and a slave gear and wherein activation of the motor causes the master gear to cause the slave gear to move the inner rod of the first guide tube relative to the outer tube.

13. The vehicle of claim 12, wherein the inner rod includes a threaded portion such that the threaded portion makes up the slave gear.

14. The vehicle of claim 9, further comprising a foldable upper cover positioned between a first side pillar portion of the vehicle and a second side pillar portion of the vehicle, wherein the foldable upper cover is positioned at least partially above a windshield.

15. A method of adjusting a roof height of a vehicle, comprising:

activating, via a controller of a roof adjustment assembly, a first guide tube to cause a first cover to move between a collapsed position and an extended position;

activating, via the controller, a second guide tube to cause a second cover to move between a stored position and a use position;

receiving, via the controller, a first signal indicating that the first guide tube is moving at a first rate at a first unit of time from a first motion sensor coupled to a portion of the first guide tube;

receiving, via the controller, a second signal indicating that the second guide tube is moving at a second rate at a second unit of time a second motion sensor coupled to a portion of the second guide tube;

determining, via the controller, a difference between the first signal and the second signal meets a predetermined threshold; and providing, via the controller, an indication to stop the movement of the first guide tube based on the determined difference between the first signal and the second signal.

16. The method of claim 15, further comprising:

providing, via the controller, an indication to stop the movement of the second guide tube based on the determined difference between the first signal and the second signal.

17. The method of claim 16, further comprising:

determining, via the controller, a difference between the first signal and the second signal meets a predetermined threshold; and providing, via the controller, an indication to stop the movement of the first guide tube based on the determined difference between the first signal and the second signal.

18. The method of claim 15, further comprising:

receiving, via the controller, a switch signal from a first upper limit switch coupled to the first guide tube and configured to detect the first guide tube is in a fully extended position; and providing, via the controller, an indication to stop the movement of the an inner rod of the first guide tube based on the switch signal.

19. The method of claim 15, further comprising:

receiving, via the controller, a third signal corresponding to a user input to an activation switch indicating to activate the first guide tube; and activating, via the controller, movement of the first guide tube in response to receiving the third signal.

20. The method of claim 15, wherein the difference between the movement of the first guide tube and the second guide tube relative to one another corresponds to a difference in variable resistance of a first wire coupled to the first guide tube and a second wire coupled to the second guide tube.

* * * * *